(12) United States Patent
Tsukamoto et al.

(10) Patent No.: US 6,665,903 B2
(45) Date of Patent: Dec. 23, 2003

(54) WIPER ARM HAVING COVER

(75) Inventors: Kazuhide Tsukamoto, Kosai (JP); Yuji Morita, Kosai (JP); Takanari Itou, Kosai (JP); Takashi Kuboichi, Kazo (JP); Kazuhito Yokoo, Kazo (JP); Seiichi Hayakawa, Kazo (JP)

(73) Assignees: Asmo Co., Lt.d., Shizuoka (JP); Nippon Wiper Blade Co., Ltd., Saitama (JP)

( * ) Notice: Subject to any disclaimer, the term of this patent is extended or adjusted under 35 U.S.C. 154(b) by 80 days.

(21) Appl. No.: 10/118,932

(22) Filed: Apr. 10, 2002

(65) Prior Publication Data

US 2002/0152575 A1 Oct. 24, 2002

(30) Foreign Application Priority Data

Apr. 20, 2001 (JP) ........................................ 2001-122825
Aug. 16, 2001 (JP) ........................................ 2001-247322

(51) Int. Cl.⁷ .............................. B60S 1/34; B60S 1/32
(52) U.S. Cl. .............................. 15/250.34; 15/250.352
(58) Field of Search ....................... 15/250.34, 250.351, 15/250.352, 250.21, 250.31

(56) References Cited

U.S. PATENT DOCUMENTS

| | | | |
|---|---|---|---|
| 2,860,364 A | * 11/1958 | Krohm ..................... | 15/250.34 |
| 3,800,356 A | * 4/1974 | Ito ........................... | 15/250.34 |
| 4,472,854 A | * 9/1984 | Bauer et al. ............ | 15/250.203 |
| 4,502,178 A | * 3/1985 | Ragot et al. ............. | 15/250.34 |
| 4,704,761 A | * 11/1987 | South et al. ............. | 15/250.19 |
| 4,856,137 A | * 8/1989 | Palu ........................ | 15/250.31 |
| 5,233,720 A | * 8/1993 | Schon ...................... | 15/250.31 |
| 5,327,614 A | * 7/1994 | Egner-Walter et al. .. | 15/250.04 |

FOREIGN PATENT DOCUMENTS

| | | | | |
|---|---|---|---|---|
| DE | 2637126 | * | 2/1977 | ............. 15/250.34 |
| DE | 3532848 | * | 1/1987 | ............. 15/250.34 |
| EP | 0628457 | * | 12/1994 | ........... 15/250.352 |
| FR | 2462311 | * | 2/1981 | ............. 15/250.34 |
| FR | 2488842 | * | 2/1982 | ............. 15/250.34 |
| FR | 2543897 | * | 10/1984 | ............. 15/250.34 |
| JP | A-8-72676 | | 3/1996 | |
| JP | A-2000-95070 | | 4/2000 | |
| JP | A-2001-247015 | | 9/2001 | |

\* cited by examiner

*Primary Examiner*—Gary K. Graham
(74) *Attorney, Agent, or Firm*—Posz & Bethards, PLC

(57) ABSTRACT

An arm head has a couple of hinge holes. A cover has a couple of hinge projections. The arm head and the cover are hingedly connected to each other through the hinge holes and the hinge projections. A rotation guide extends radially outwardly from each hinge hole. A protrusion protrudes radially outwardly from each hinge projection and is received in the rotation guide. A locking projection extends from the rotation guide. The locking projection is spaced from an opening movement limiting end of the rotation guide for a distance, which is substantially the same as a width of the protrusion of the hinge projection.

15 Claims, 10 Drawing Sheets

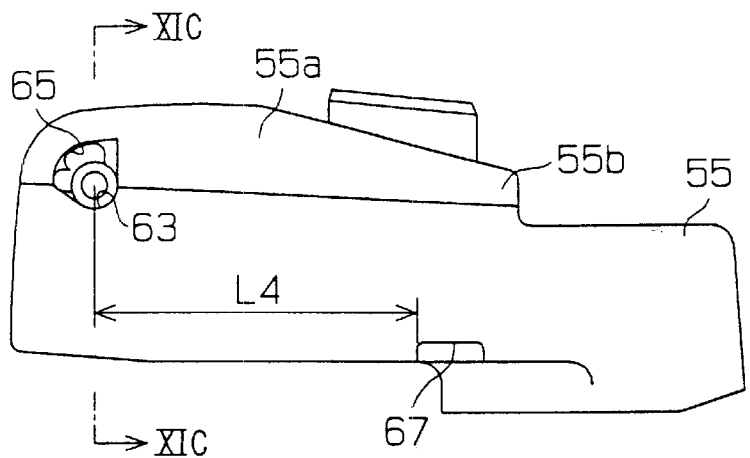
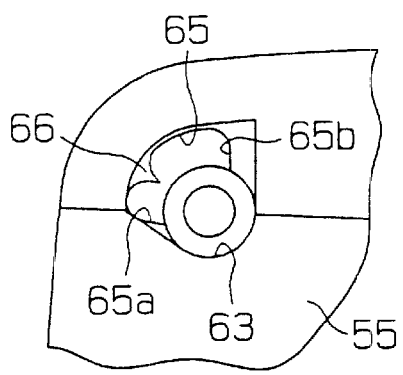
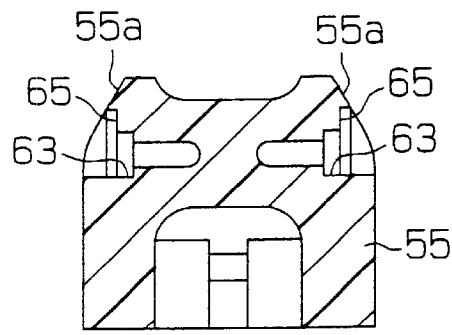
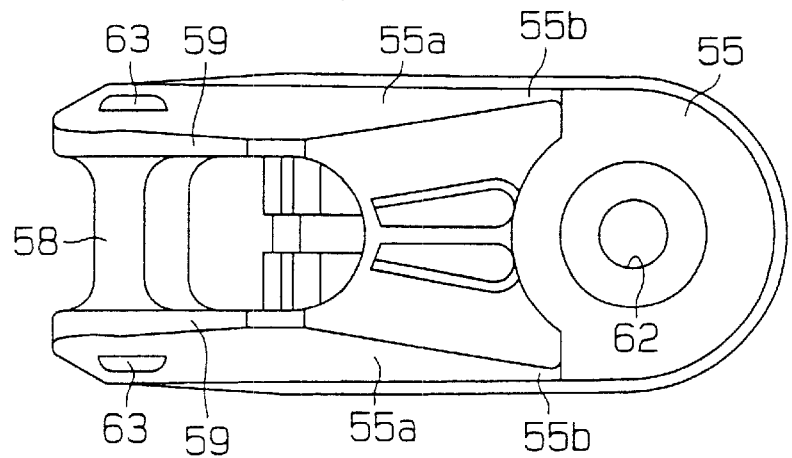

WIPER ARM HAVING COVER

CROSS REFERENCE TO RELATED APPLICATION

This application is based on and incorporates herein by reference Japanese Patent Application No. 2001-122825 filed on Apr. 20, 2001 and Japanese Patent Application No. 2001-247322 filed on Aug. 16, 2001.

BACKGROUND OF THE INVENTION

1. Field of the Invention

The present invention relates to a wiper arm having a cover for covering at least part of an arm head of the wiper arm, at which the wiper arm is connected to a pivot shaft.

2. Description of Related Art

A securing portion of a base end portion (also referred to as an arm head) of a wiper arm is connected to a pivot shaft, for example, by installing and tightening a nut onto a threaded portion of a distal end of the pivot shaft received through the securing portion of the base end portion of the wiper arm. The securing portion of the wiper arm is covered with a cover (cap) to achieve an improved appearance of the wiper and/or to restrain penetration of water into the securing portion (e.g., penetration of the water to the pivot shaft).

The wiper arm having the cover for covering the securing portion is disclosed, for example, in Japanese Unexamined Patent Publication No. 2000-95070 and Japanese Unexamined Patent Publication No. 8-72676.

Japanese unexamined Patent Publication No. 2000-95070 discloses a wiper arm provided with a detachable cover. In this wiper arm, the cover partially covers a minimum required portion of the securing portion. At time of maintenance work or the like, the cover is removed from the base end portion. Furthermore, when the wiper arm is shipped from a wiper manufacturer to an automobile manufacturer, the cover is connected to the base end portion. Thus, in the automobile manufacturer, when the wiper arm is connected to a vehicle body (pivot shaft), the cover is first removed from the based end portion of the wiper arm. After the wiper arm is connected to the vehicle body (pivot shaft), the cover needs to be connected to the base end portion once again, resulting in the tedious time consuming assembling operation. Furthermore, the removed cover can be lost during the assembling operation, causing an interruption of the assembling operation.

Japanese Unexamined Patent Publication No. 8-72676 discloses a wiper arm provided with a cover, which covers most of a base end portion of the wiper arm including lateral walls of the base end portion. In this wiper arm, although a size of the cover is larger than the cover disclosed in Japanese unexamined Patent Publication No. 2000-95070, the cover is hingedly connected to the base end portion in a manner that allows closing and opening of the securing portion of the base end portion by the cover without detachment of the cover from the base end portion. However, when the cover is placed in the open state, the cover is only hingedly connected to the base end portion, so that the cover can be easily rotated by relatively small vibrations and loads, causing unintentional closing movement of the cover. Thus, in the connecting operation of the wiper arm to the vehicle (pivot shaft), the cover often interferes with the connecting operation.

Furthermore, after the wiper arm is connected to the vehicle (pivot shaft), the cover needs to be securely closed against the securing portion of the base end portion. To achieve this, an engaging piece and an engaging groove are provided in the cover and the base end portion, respectively, to engage with each other when the cover is closed against the securing portion. The engaging piece and the engaging groove are also engaged with each other to prevent unintentional rotation (opening) of the cover and damage of the cover by vibrations or the like when the wiper arm is shipped or is transported (for example, for the purpose of product delivery). Thus, before the wiper arm is connected to the vehicle (pivot shaft), the engaging claw and the engaging groove need to be disengaged from each other to open the cover, causing the tedious time consuming assembling operation.

SUMMARY OF THE INVENTION

The present invention addresses the above disadvantages. Thus, it is an objective of the present invention to provide a wiper arm, which can achieve an improved appearance of the wiper arm and can accelerate a connecting operation of an arm head of the wiper arm to a pivot shaft.

To achieve the objective of the present invention, there is provided a wiper arm including an arm head, which is securely connected to a pivot shaft, a cover, which is connected to the arm head for covering at least part of the arm head and is rotatable in a closing direction and an opening direction about a rotational axis thereof between a fully closed position and a fully opened position relative to the arm head, and an intermediate position holding means for restraining rotation of the cover in both the closing direction and the opening direction at at least one intermediate position between the fully opened position and the fully closed position.

The intermediate position holding means may include at least one holding projection and at least one holding hole. The at least one holding projection is provided in one of the cover and the arm head. The at least one holding hole is provided in the other of the cover and the arm head and is engageable with a corresponding one of the at least one holding projection.

Alternatively, the intermediate position holding means may include at least one holding projection, at least one first engaging protrusion and at least one second engaging protrusion. The at least one holding projection protrudes from the cover and is resiliently engaged with an outer wall surface of the arm head to restrain the rotation of the cover when the cover is rotated in the closing direction. The at least one first engaging protrusion is provided in the other of the cover and the arm head and protrudes from a corresponding one of the hinge projections. The at least one second engaging protrusion is provided in the one of the cover and the arm head and is located adjacent to a corresponding one of the hinge holes.

The wiper arm may further includes a fully opened position holding means for restraining the rotation of the cover in the closing direction at the fully opened position. The fully opened position holding means may include the at least one first engaging protrusion, the at least one second engaging protrusion and at least one opening movement limiting end. The at least one opening movement limiting end is provided in the one of the cover and the arm head and is located adjacent to a corresponding one of the hinge holes, wherein when the cover is positioned in the fully opened position, each first engaging protrusion abuts against a corresponding one of the at least one opening movement limiting end and is held between the corresponding one of the at least one second engaging protrusion and the corresponding one of the at least one opening movement limiting end.

BRIEF DESCRIPTION OF THE DRAWINGS

The invention, together with additional objectives, features and advantages thereof, will be best understood from the following description, the appended claims and the accompanying drawings in which:

FIG. 11A is a side view of the arm head;

FIG. 11B is a partial enlarged view of FIG. 11A;

FIG. 11C is a cross sectional view along line XIC—XIC in FIG. 11A;

FIG. 11D is a plan view of the arm head;

DETAILED DESCRIPTION OF THE INVENTION (First Embodiment)

A first embodiment of the present invention will be described with reference to FIGS. 1 to 6.

Figure 2:
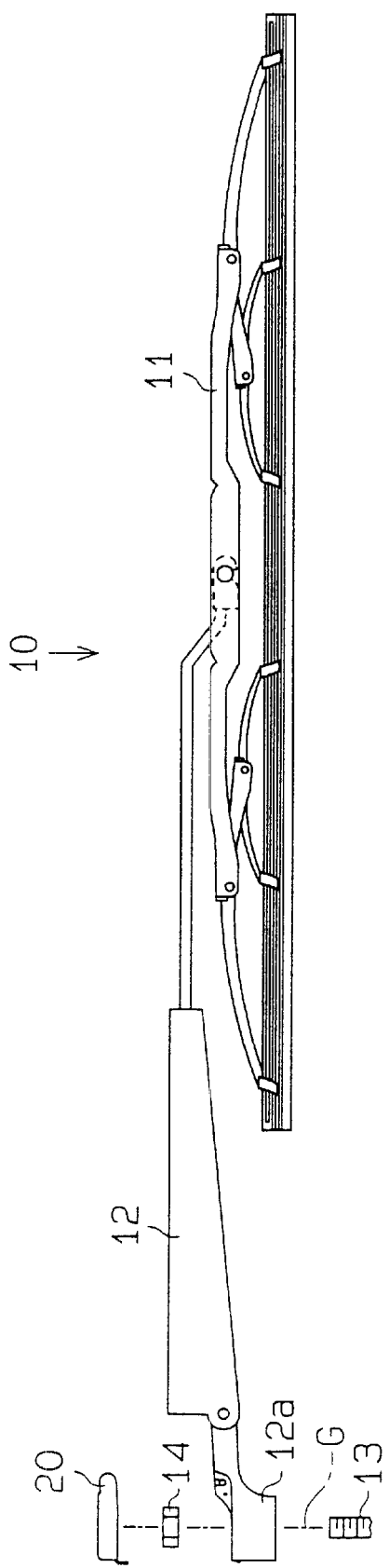
FIG. 2 is a partially exploded side view of the wiper.

FIG. 2 is a partially exploded side view showing a wiper 10. As shown in FIG. 2, the wiper 10 includes a blade 11 and a wiper arm 12. The blade 11 wipes a window glass. The wiper arm 12 supports the blade 11. A base end portion (arm head) 12a of the wiper 10 (wiper arm 12) receives a pivot shaft 13 of a link (not shown), which is driven by a wiper motor. When a nut 14 is tightened onto a threaded portion formed in a distal end of the pivot shaft 13, the base end portion 12a is secured to the pivot shaft 13 and moves together with the link. An axial direction of the pivot shaft 13, i.e., an installation direction of the wiper arm 12, substantially coincides with the vertical direction (gravity direction) G. The wiper arm 12 is secured to the pivot shaft 13 with aid of the nut 14 at a securing portion 40 of the wiper arm 12 (base end portion 12a). The securing portion 40 is covered with a cover (also referred to as a cap) 20. The cover 20 achieves an improved appearance of the wiper 10 and restrains penetration of water into the securing portion 40 (e.g., penetration of the water to the pivot shaft 13).

Next, detailed structures of the base end portion 12a of the wiper arm 12 and of the cover 20 will be described with reference to FIGS. 1A and 1B.

Figure 1A:
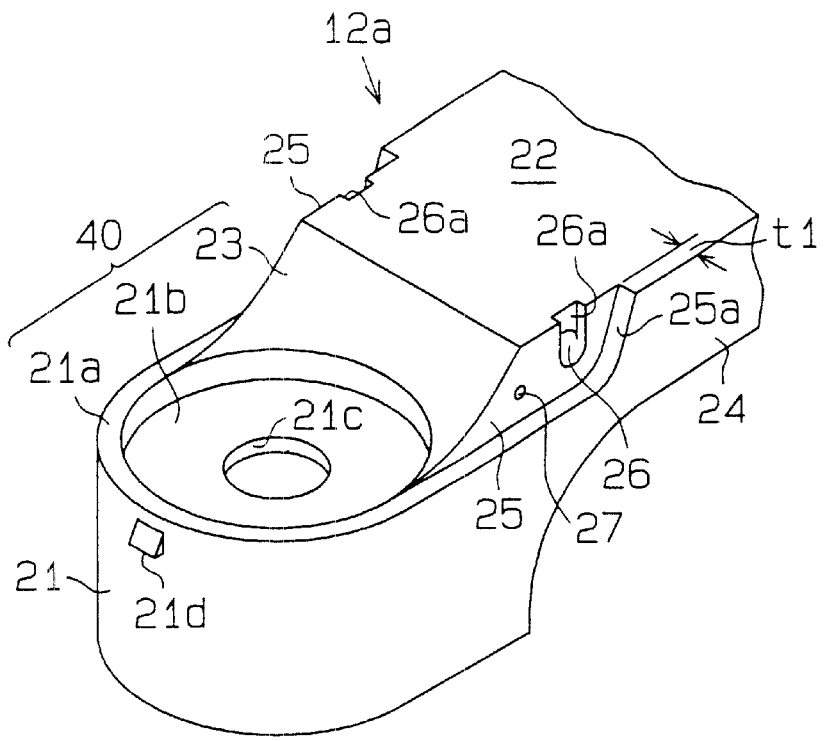
FIG. 1A is a partial perspective view of a base end portion of a wiper according to a first embodiment of the present invention.

As shown in FIG. 1A, the base end portion 12a includes a base 21. The base 21 extends in the axial direction (downward direction in FIG. 1A) of the pivot shaft 13 and is shaped into a generally cylindrical shape having an outer diameter that substantially coincides with a width of the wiper arm 12. The base end portion 12a also includes a top plate 22. A slanted surface 23, which is slanted generally in the axial direction (downward direction in FIG. 1A) of the pivot shaft 13, extends from the top plate 22. The slanted surface 23 connects between the top plate 22 and a top surface 21a of the base 21, and a predetermined height difference is provided between the top surface 21a of the base 21 and the top plate 22.

The base 21 includes a nut receiving portion 21b, which is recessed from the top surface 21a of the base 21 generally in the axial direction and has a generally circular cross-section. A pivot shaft receiving hole 21c extends in the axial direction through the center of the nut receiving portion 21b of the base 21 and receives the distal end of the pivot shaft 13. An inner peripheral surface of the pivot shaft receiving hole 21c has a shape, which corresponds to a serrated outer peripheral surface of a tapered portion provided in the distal end of the pivot shaft 13. The wiper 10 (wiper arm 12) is secured to the link (pivot shaft 13) by inserting the pivot shaft 13 through the pivot shaft receiving hole 21c from one side (from the downside in FIG. 1A) of the base 21 and then installing and tightening the nut 14 onto the threaded portion formed in the distal end of the pivot shaft 13 protruding from the pivot shaft receiving hole 21c on the other side (topside in FIG. 1A) of the base 21. The nut 14 is received in the nut receiving portion 21b. The nut 14 is sized such that the nut 14 does not reach the height of the top plate 22. When the pivot shaft 13 and the nut 14 are connected to the securing portion 40 of the wiper arm 12 (base end portion 12a) in the manner discussed above, the securing portion 40 of the wiper arm 12 is secured to the pivot shaft 13.

A locking claw 21d is formed in the base 21 near the top surface 21a of the base 21 and protrudes radially outwardly. The cover 20 is secured to the base 21 when the cover 20 is engaged with the locking claw 21d in a manner discussed later.

Each of opposite lateral walls 24 of the base end portion 12a has a cover fitting portion 25. Each cover fitting portion 25 is recessed in a widthwise direction of the base end portion 12a and extends from the top plate 22 to the top surface 21a of the base 21. Each cover fitting portion 25 has a hinge hole 26, which is recessed in the widthwise direction of the base end portion 12a. The hinge holes 26 form a hinge connection between the base end portion 12a and the cover 20 in a manner discussed later. Each cover fitting portion 25 also has a guide groove 26a, which is recessed in the widthwise direction of the base end portion 12a adjacent to the corresponding hinge hole 26 and opens to the top plate 22. When the cover 20 is connected to the base end portion 12a, the guide grooves 26a guide the cover 20.

Each cover fitting portion 25 also has a holding hole 27, which is recessed in the widthwise direction of the base end portion 12a near the corresponding hinge hole 26. The holding holes 27 engage with the cover 20 in a manner described later.

Figure 1B:
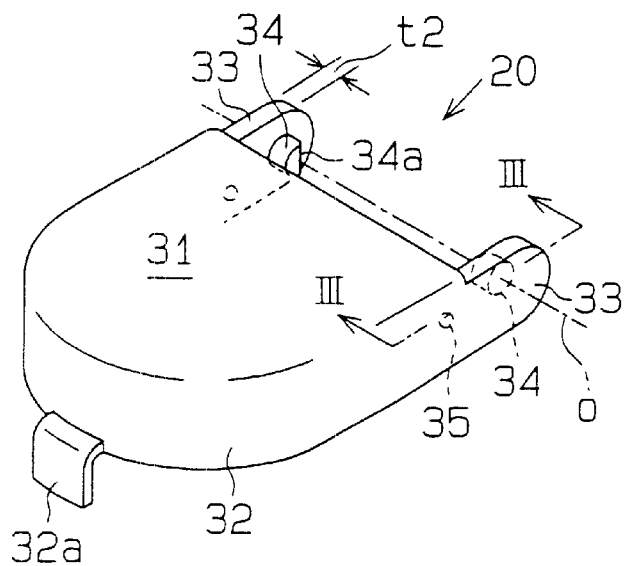
FIG. 1B is a perspective view of a cover of the wiper.

With reference to FIG. 1B, the cover 20 is made, for example, of a resin material and includes a covering portion 31 and a peripheral wall 32. The covering portion 31 is formed to correspond with the slanted surface 23 of the base end portion 12a and the top surface 21a of the base 21. The peripheral wall 32 extends along an outer peripheral edge of the covering portion 31 and has a wall thickness t2, which is substantially the same as a step size t1 of the cover fitting portion 25. A couple of legs 33 extend from ends of the peripheral wall 32 (or covering portion 31) such that the legs 33 substantially correspond with the corresponding cover fitting portions 25.

An inner wall surface of each leg 33 has a hinge projection 34, which projects inwardly in the widthwise direction of the cover 20 such that the hinge projection 34 is engageable with the corresponding hinge hole 26. The hinge projections 34 of the cover 20 are inserted into the hinge holes 26, respectively, of the wiper arm 12 (the base end portion 12a), so that the cover 20 is hingedly connected to the wiper arm 12 (the base end portion 12a) about a hinge axis 0 shown in FIG. 1B.

Figure 3:
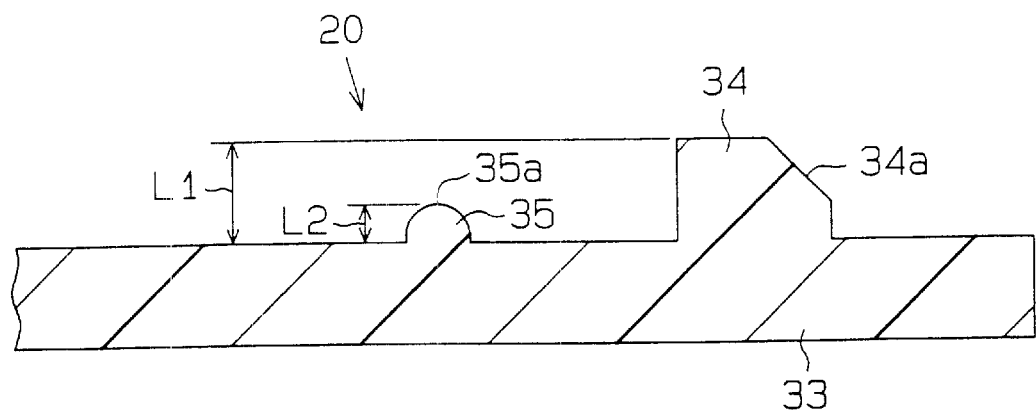
FIG. 3 is a partial enlarged cross sectional view taken along line III—III in FIG. 1B.
Figure 6:
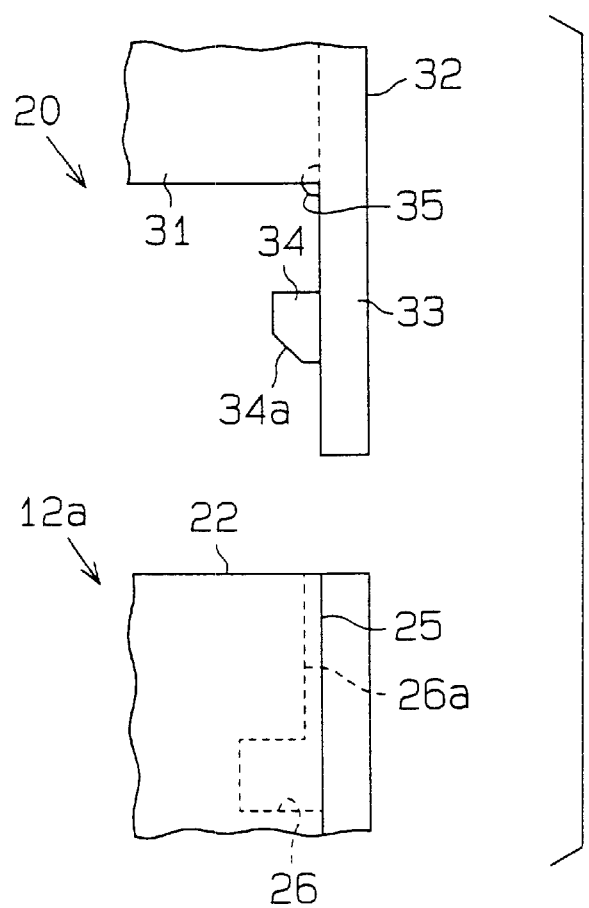
FIG. 6 is a schematic partial view showing connection of hinge projection of the cover to a hinge hole of the base end portion.

As shown in FIG. 3, a distal end of each hinge projection 34 has a tapered surface 34a on a proximal end side (right side in FIG. 3) of the cover 20. With reference to FIG. 6, the cover 20 is hingedly connected to the base end portion 12a in a direction perpendicular to a plane of the top plate 22. During this connecting process, the hinge projections 34 of the legs 33 of the cover 20 are guided along the guide grooves 26a, respectively, until the hinge projections 34 are engaged with the hinge holes 26, respectively. When the hinge projections 34 of the legs 33 are guided along the guide grooves 26a, the tapered surfaces 34a of the hinge projections 34 contact the guide grooves 26a and causes the legs 33 of the cover 20 to be gradually urged laterally outwardly, so that the legs 33 of the cover 20 are gradually bent laterally outwardly. In this way, the cover 20 is smoothly connected to the base end portion 12a.

Figure 4:
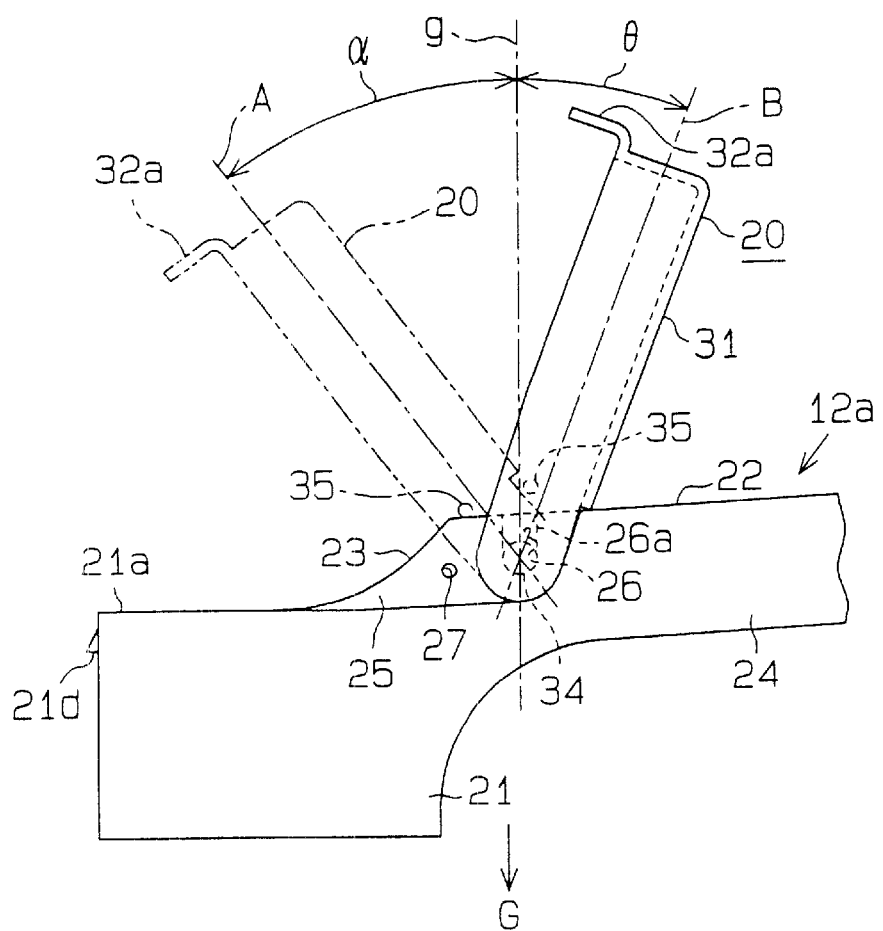
FIG. 4 is a schematic partial side view showing movement of the cover relative to the base end portion.

The inner wall surface of each leg 33 has a holding projection 35, which protrudes inwardly in the widthwise direction of the cover 20 such that the holding projection 35 is engageable with the corresponding holding hole 27. The holding projections 35 and the holding holes 27 constitute an intermediate position holding means of the present invention. With reference to FIG. 4, when the cover 20, which has been fully opened as indicated with a solid line in FIG. 4, is rotated unintentionally in a closing direction (left direction in FIG. 4), the holding projections 35 abut against or are resiliently engaged with the top plate 22 and thus restrain further rotation of the cover 20 at the position indicated with a dot-dot-dash line in FIG. 4. In other words, when the cover 20 is rotated to an intermediate position (hereinafter, this position will be referred to as a intermediate position A) between a fully opened position and a fully closed position in the closing direction for an angle α relative to a plane g, the holding projections 35 abut against the wiper arm 12 (base end portion 12a) and thus restrain the further rotation of the cover 20. Here, the plane g extends through the rotational axis of the hinge projection 34 in a direction substantially parallel to the gravity direction G.

As indicated with the solid line in FIG. 4, the cover 20 is fully opened when a proximal end of the covering portion 31 of the cover 20 abuts against the top plate 22 (at this time, the distal end of the cover 20 is located on a second side of the plane g). At the fully opened state, the cover 20 is placed in the predetermined position (hereinafter, this position is referred to as a fully opened position B) spaced away from the plane g for a predetermined angle θ in an opening direction opposite to the closing direction. Thus, in the connecting operation of the wiper 10 (wiper arm 12) to the pivot shaft 13, unintentional closing movement of the cover 20 from the fully opened position is restrained by a gravitational force applied to the cover 20 due to the angle θ from the plane g. Furthermore, even when the cover 20 is rotated beyond the plane g in the closing direction, the cover 20 can be held at the intermediate position A (at this time, the distal end of the cover 20 is located on a first side of the plane g), which is spaced from the plane g for the angle α, as described above. As a result, unintentional closing movement of the cover 20 is advantageously restrained, and thus the connecting operation of the wiper 10 (wiper arm 12) to the pivot shaft 13 is not interfered by the cover 20.

Figure 5:
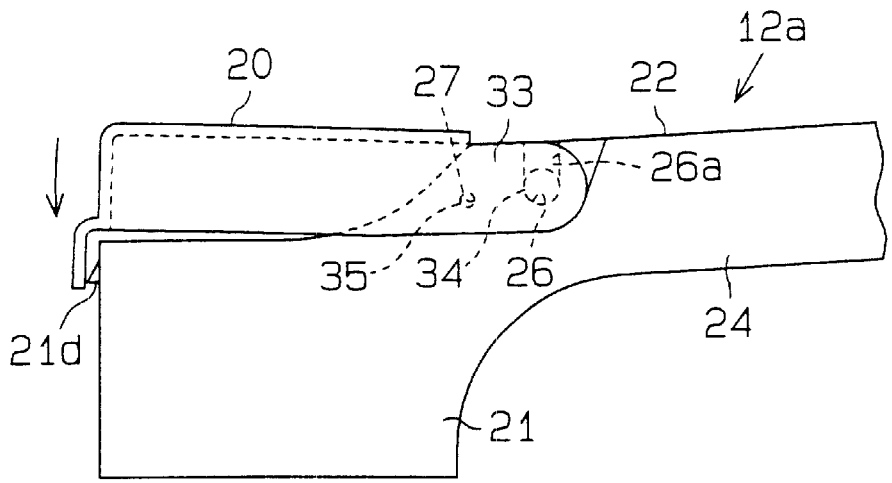
FIG. 5 is a view similar to FIG. 4 showing a slightly opened position of the cover.

Furthermore, with reference to FIG. 5, the cover 20 is temporarily assembled when the holding projections 35 are engaged with the holding holes 27 to restrain the further rotation of the cover 20 relative to the wiper arm 12 (base end portion 12a) at a predetermined position (this position will be referred to as a slightly opened position or incompletely closed position) just before the cover 20 is fully closed. As shown in FIG. 3, a surface 35a of each holding projection 35 is rounded and is shaped into a generally hemisphere shape. This allows easy engagement and easy disengagement between each holding projection 35 and the corresponding holding hole 27. Thus, when the wiper 10 is transported from one manufacturing location to another manufacturing location where the wiper 10 is connected to the pivot shaft 13, the temporal assembling of the cover 20 (i.e., the engagement between each holding projection 35 of the cover 20 and the corresponding holding hole 27 of the base end portion 12a) restrains the cover 20 from being unintentionally rotated (i.e., opened) and thereby being damaged by relatively small vibrations, shocks or the like during the transportation of the wiper 10. Since the cover 20 is temporarily assembled to the wiper arm 12 (hereinafter, this state will be referred to as incompletely closed state), the cover 20 can be easily opened when the wiper 10 needs to be assembled to the pivot shaft 13.

As shown in FIG. 3, a projecting length L2 of each holding projection 35 is shorter than a projecting length L1 of the hinge projection 34. When the cover 20 is temporarily assembled to the wiper arm 12, the holding projections 35 may be elastically engaged with the cover fitting portions 25, respectively, and cause the legs 33 to be laterally outwardly bent. However, the lateral bending of the legs 33 will not cause disengagement between each hinge projection 34 and the corresponding hinge hole 26 because of the shorter projecting length L2 of each holding projection 35. Furthermore, each holding projection 35 is arranged near the hinge projection 34, so that a travel distance of the holding projection 35 to the holding hole 27 along the corresponding cover fitting portion 25 is minimized when the cover 20 is temporarily assembled to the wiper arm 12.

An engaging piece 32a protrudes from a distal end of the cover 20 (peripheral wall 32) to engage with the engaging claw 21d. The engaging piece 32a is engaged with the engaging claw 21d when the cover 20 is fully closed. In this way, the cover 20 is securely engaged with the wiper arm 12 and will not be disengaged from the wiper arm 12 unless the engaging piece 32a is intentionally and forcefully disengaged from the engaging claw 21d, for example, by a maintenance worker. The securing portion 40 of the wiper arm 12 (base end portion 12a) is covered with the cover 20 and is thus protected from penetration of water.

The first embodiment has the following advantages.

(1) The cover 20 has the holding projections 35, which abut against the base end portion 12a at the intermediate position A to restrain the closing movement of the cover 20. Thus, once the cover 20 is opened in the opening direction beyond the intermediate position A, the cover 20 is restrained from being fully closed, for example, by the relatively small vibrations, loads or the like. Thus, when the wiper arm 12 is connected to the pivot shaft 13, the cover 20 is not likely to interfere with the connecting operation of the wiper arm 12.

(2) The cover 20 can be opened in the opening direction beyond the plane g, which extends through the rotational axis of the hinge projection 34 in the direction substantially parallel to the gravity direction G. Thus, when the cover 20 is positioned at the fully opened position B, the cover 20 can maintain its fully opened state by its own weight. Furthermore, even if the cover 20 is unintentionally rotated in the closing direction beyond the plane g, the holding projections 35 of the cover 20 abut against the base end portion 12a at the intermediate position A to maintain the open state of the cover 20. As a result, the unintentional closing movement of the cover 20 is restrained, and the cover 20 does not interfere with the connecting operation of the wiper arm 20.

(3) The base end portion 12a has the holding holes or recesses 27 for engaging with the holding projections 35, respectively, at the slightly opened position. Thus, when the holding projections 35 are engaged with the engaging recesses 27, the incompletely closed state of the cover 20 is maintained at the slightly opened position. Thus, when the wiper arm 12 is transported (for example, for the purpose of product delivery), the holding projections 35 of the cover 20 can be engaged with the engaging recesses 27 to restrain unintentional swing motion (rotation) of the cover 20 to hold the cover 20 in the incompletely closed state. Furthermore, holding force for holding the cover 20 at the incompletely closed state by the engaging force between each holding projection 35 and the corresponding engaging recess 27 is smaller than holding force for holding the cover 20 at the fully closed state by the engaging force between the engaging claw 21d and the engaging piece 32a. Thus, before the wiper arm 12 is connected to the pivot shaft 13, the engagement between each holding projection 35 and the corresponding engaging recess 27 can be easily released to open the cover 20, allowing acceleration of the assembling work.

(4) The hinge projections 34 are engaged with the hinge holes 26, respectively, so that the cover 20 is hingedly connected to the base end portion 12a. The holding projections 35 are elastically engaged (or elastically contact) with the base end portion 12a when the holding projections 35 are located between the intermediate position A and the slightly opened position. Since the projecting length L2 of each holding projection 35 is shorter than the projecting length L1 of each hinge projection 34, each hinge projection 34 is not disengaged from the corresponding hinge hole 26 even if the cover 20 (legs 33) is laterally outwardly urged and is thus laterally outwardly expanded by the elastic engagement between the holding projections 35 and the base end portion 12a.

(5) The hinge projections 34 formed in the legs 33 are engaged with the hinge holes 26, respectively, so that the cover 20 is hingedly connected to the base end portion 12a. Each hinge projection 34 has the tapered surface 34a. The tapered surfaces 34a of the hinge projections 34 gradually laterally outwardly bend the legs 34 when the hinge projections 34 are engaged with the hinge holes 26, so that the hinge projections 34 can be smoothly engaged with the hinge holes 26.

(6) The distal end (surface 35a) of the holding projection 35 is rounded. Thus, the holding projections 35 can be easily engaged with and easily disengaged from the holding holes 27, respectively.

(Second Embodiment)

A second embodiment of the present invention will be described with reference to FIGS. 7 to 13.

The second embodiment is similar to the first embodiment except that the configuration and the rotation restraining structure of the cover 20 of the first embodiment are modified. Thus, in the second embodiment, the components similar to those of the first embodiment will be indicated by similar numerals and will not be further described.

Figure 7:
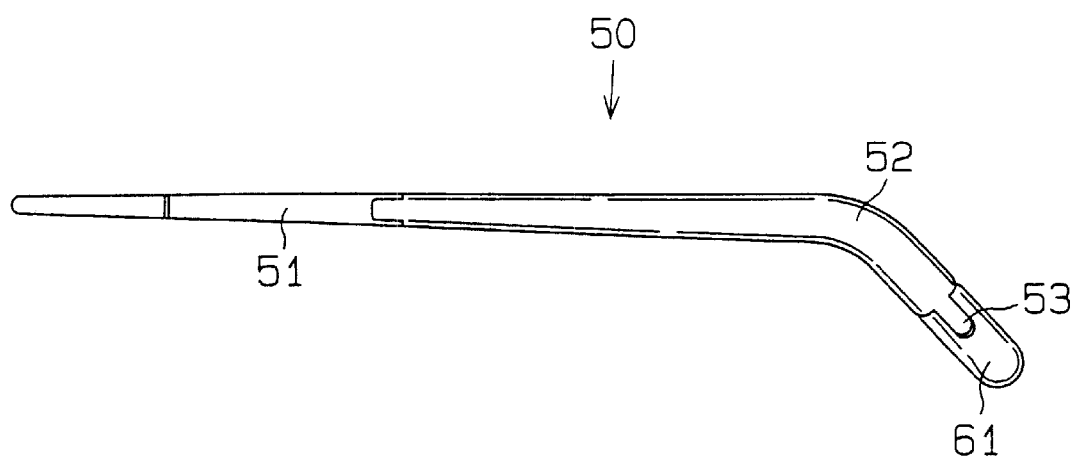
FIG. 7 is a plan view of a vehicle rear wiper according to a second embodiment of the present invention.
Figure 8:
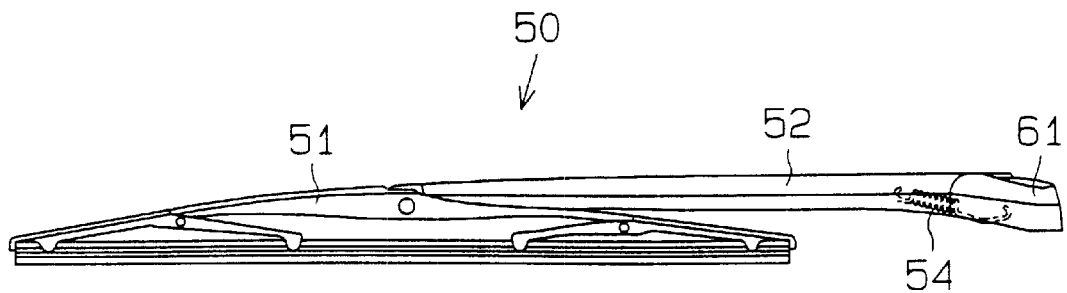
FIG. 8 is a side view of the vehicle rear wiper.

With reference to FIGS. 7 and 8, a rear wiper 50 according to the second embodiment has a blade 51 and a wiper arm (arm member) 52. A base end portion 53 of the wiper arm 52 is rotatably connected to an arm head 55 covered with a cover (head cover or cap) 61. A coil spring 54 is connected between the wiper arm 52 and the arm head 55.

Figure 9:
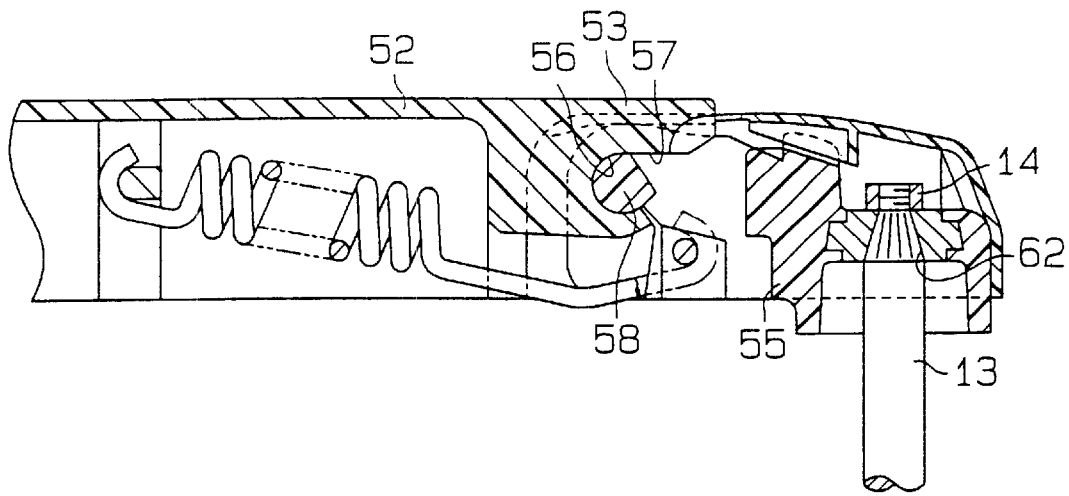
FIG. 9 is a partial enlarged cross sectional view showing connection between a wiper arm and an arm head of the rear wiper.

FIG. 9 shows a partial cross-sectional view of connection between the wiper arm 52 and the arm head 55. As shown in FIG. 9, the base end portion 53 of the wiper arm 52 protrudes at a widthwise center of the wiper arm 52 (FIG. 7). A shaft hole or recess 56 is formed in the base end portion 53 and penetrates through the base end portion 53 in the widthwise direction of the wiper arm 52. The shaft hole 56 has an opening 57, which is opened on an arm head 55 side of the shaft hole 56. A connecting shaft 58 of the arm head 55 is received in the shaft hole 56 through the opening 57.

A distal end side (wiper arm side) of the arm head 55 is branched into two branched legs 59 (FIG. 11D). The connecting shaft 58 of the arm head 55 is connected between the branched legs 59. When the connecting shaft 58 is received into the shaft hole 56 through the opening 57, the base end portion 53 of the wiper arm 52 is rotatably connected to the distal end side of the arm head 55. At this connected state, the base end portion 53 of the wiper arm 52 is arranged between the branched legs 59 of the arm head 55.

With reference to FIG. 9, a pivot shaft side end portion of the arm head 55, which is opposite to the wiper arm 52, is connected to the pivot shaft 13 extending from the vehicle body by tightening the nut 14 onto the threaded distal end portion of the pivot shaft 13.

Figure 10:
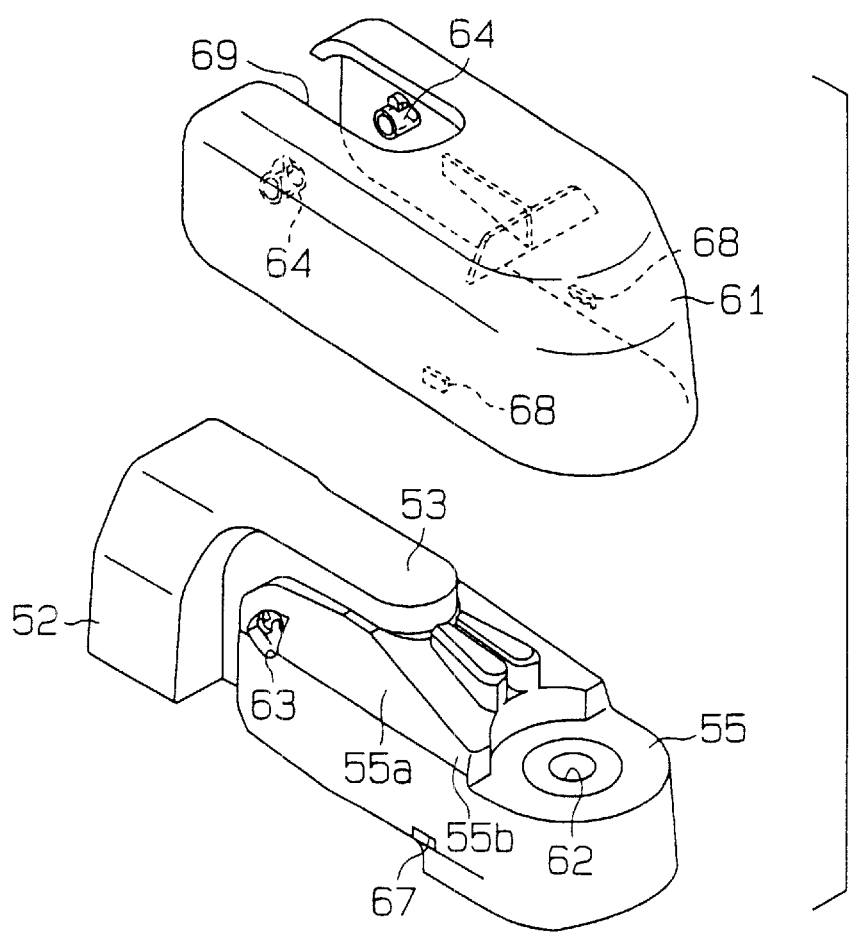
FIG. 10 is a perspective view showing the connection between the wiper arm and the arm head of the rear wiper.

With reference to FIG. 10, the arm head 55 has a width that is substantially the same as that of the wiper arm 52. The wiper arm side end portion of the arm head 55 is connected to the wiper arm 52 in the manner described above. A pivot shaft receiving hole 62 for receiving the pivot shaft 13 therethrough extends through the pivot shaft side end portion (securing portion) of the arm head 55 in a top-bottom direction in FIG. 10. A flat top surface of the arm head 55 surrounds the pivot shaft receiving hole 62 of the arm head 55. As shown in FIG. 9, the nut 14 is securely tightened onto the distal end portion of the pivot shaft 13, which protrudes from the pivot shaft receiving hole 62, so that the arm head 55 is secured to the pivot shaft 13.

As shown in FIGS. 10 to 11B, hinge holes 63 are recessed in opposite lateral walls, respectively, of the arm head 55 at the wiper arm side end portion of the arm head 55 in the widthwise direction of the arm head 55. As shown in FIGS. 11B and 11C, each hinge hole 63 is a generally cylindrical hole for receiving a corresponding hinge projection (connecting shaft) 64. A recessed portion extends from each hinge hole 63 in a radial direction of the hinge hole 63 to form a rotation guide 65.

A circumferential size of each rotation guide 65 determines a rotatable range (between a position A and a position B in FIG. 14B) of the corresponding hinge projection 64. Each rotation guide 65 includes an opening movement limiting end 65a and a closing movement limiting end 65b. The opening movement limiting end 65a of the rotation guide 65 limits the rotation of the corresponding hinge projection 64 to prevent further opening movement of the cover 61 beyond the opening movement limiting end 65a. The closing movement limiting end 65b of the rotation guide 65 limits the rotation of the corresponding hinge projection 64 when the cover 61 is closed. An angle between the opening movement limiting end 65a and the closing movement limiting end 65b is set to about 90 degrees to limit the rotatable range of the cover 61 within this angular range.

With reference to FIG. 11B, each rotation guide 65 has a locking projection (second engaging protrusion) 66, which is arranged at a position (position C in FIG. 14B) near the opening movement limiting end 65a and extends inwardly in the radial direction of the corresponding hinge hole 63. The locking projection 66 is sized such that when a protrusion (first engaging protrusion) 64a, which protrudes from each hinge projection 64, is rotated along the rotation guide 65, the locking projection 66 can appropriately control the rotation of the protrusion 64a. That is, the locking projection 66 can lock the protrusion 64a and allows the protrusion 64a held in the locked state to move beyond the locking projection 66 toward the closing movement limiting end 65b when force equal to or greater than a predetermined value is applied to the protrusion 64a. More specifically, the locking projection 66 holds the cover 61 in the locked state and restrains the cover 61 from being closed, for example, by its own weight. The force equal to or greater than the predetermined value is the force required to release the cover 61 from the locked state.

As shown in FIGS. 11C and 11D, the arm head 55 has tapered surfaces 55a on its opposite lateral walls, respectively, so that the width of the arm head 55 is progressively reduced toward a top of the arm head 55 from a vertical point where the hinge holes 63 are arranged. Each tapered surface 55a extends along the corresponding lateral side of the arm head 55 except around the pivot shaft receiving hole 62 and has a tapered surface distal end 55b on the pivot shaft side end portion of the arm head 55. The tapered surface distal end 55b is arranged such that a distance between the tapered surface distal end 55b and the hinge hole 63 is longer than a distance between the hinge projection 64 and an engaging claw (holding projection) 68 provided on the same lateral side in the cover 61.

As shown in FIG. 11A, an engaging recess 67 is recessed in the widthwise direction of the arm head 55 at the longitudinal center of the lower edge of each lateral wall of the arm head 55.

Figure 12A:
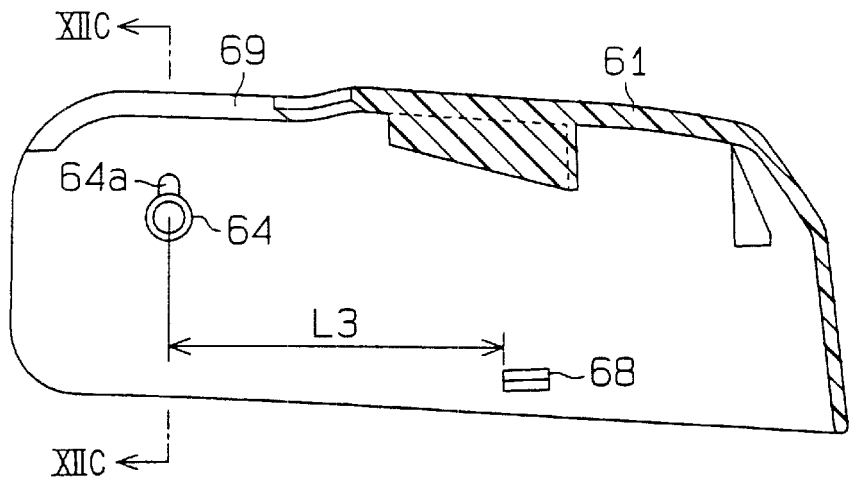
FIG. 12A is a cross-sectional view of a cover of the rear wiper.
Figure 12B:
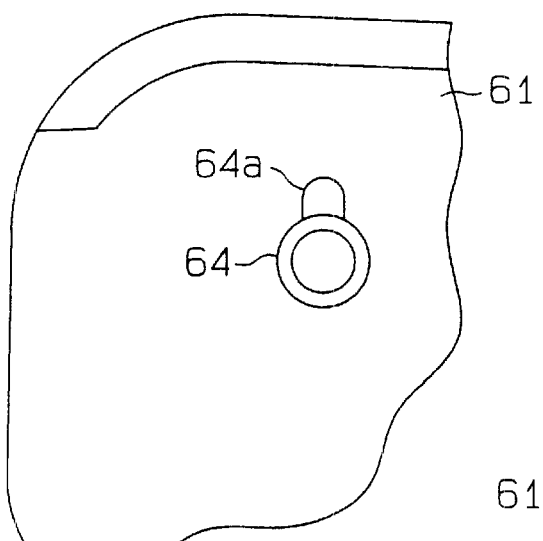
FIG. 12B is a partial enlarged view of FIG. 12A.
Figure 12C:
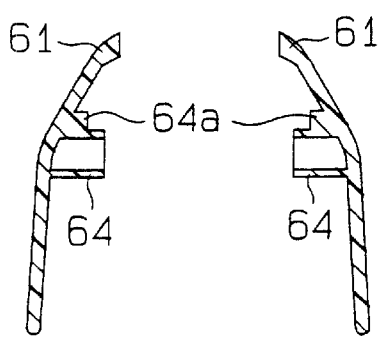
FIG. 12C is a cross sectional view along line XIIC—XIIC in FIG. 12A.

With reference to FIGS. 12A to 12C, in a proximal end side (left side in FIG. 12A) top surface of the cover 61, a slit 69 extends toward a distal end (right side in FIG. 12A). The slit 69 has a shape corresponding to the base end portion 53 of the wiper arm 52. A hinge projection 64 extends inwardly from each inner lateral wall surface of the cover 61 on the proximal end side of the cover 61.

As shown in FIG. 10, the cover 61 is sized to cover the entire arm head 55. The hinge projections 64 are shaped into a cylindrical shape and are coaxial to each other. An outer diameter of each hinge projection 64 is slightly smaller than an inner diameter of the corresponding hinge hole 63 of the arm head 55 to allow insertion and engagement of the hinge projection 64 in the corresponding hinge hole 63. When each hinge projection 64 is received in the corresponding hinge hole 63, the cover 61 is hingedly connected to the arm head 55.

As shown in FIG. 12B, each protrusion 64a extends outwardly from an outer peripheral edge of the corresponding hinge projection 64 in a radial direction the hinge projection 64. A distal end of each projection 64a is rounded. A radial length of each protrusion 64a in the radial direction of the corresponding projection 64 is substantially the same as a radial length of the corresponding rotation guide portion 65 in the radial direction of the hinge hole 63. A circumferential width of each protrusion 64a is substantially the same as a width between the corresponding locking projection 66 and the corresponding opening movement limiting end 65a.

As shown in FIG. 12A, each engaging claw 68 extends inwardly from a lower end portion of a lateral inner wall surface of the cover 61. Each engaging claw 68 has a generally rectangular cross-section and has a tapered inner lower end. The engaging claws 68 are provided such that a distance L3 between the hinge projection 64 and the engaging claw 68 provided in the cover 61 is substantially the same as a distance L4 (FIG. 11A) between the hinge hole 63 and the engaging recess 67. That is, the engaging claws 68 are provided such that the engaging claws 68 of the cover 61 are engaged with the engaging recesses 67, respectively, of the arm head 55 when the cover 61 is closed relative to the arm head 55.

As shown in FIG. 12C, the top side of the cover 61 (top side in FIG. 12C) is formed such that a width of the cover 61 decreases toward the top end of the cover 61 to coincide with the tapered surfaces 55a of the top side of the arm head 55. Each hinge projection 64 and each corresponding protrusion 64a are formed such that a distance between the lateral inner wall surface of the cover 61 to an inner end surface (located on the center side of the cover 61) of the hinge projection 64 is greater than a distance between the lateral inner wall surface of the cover 61 and an inner end surface (located on the center side of the cover 61) of the corresponding protrusion 64a. Thus, a step is formed between the inner end surface of the hinge projection 64 and the inner end surface of the protrusion 64a in the widthwise direction of the cover 61. A size of this step between the hinge projection 64 and the protrusion 64a in the widthwise direction of the cover 61 is larger than a thickness (measured in the widthwise direction of the arm head 55) of the locking projection 66 formed in the rotation guide 65 shown in FIG. 11B.

Figure 13:
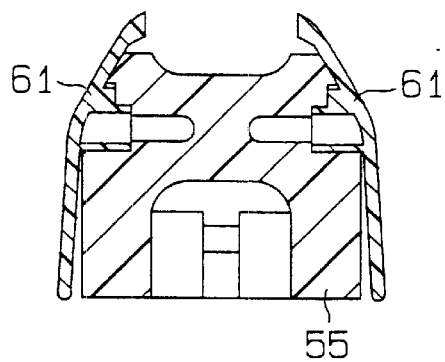
FIG. 13 is a partial cross sectional view showing connection between the arm head and the cover in a closed state of the cover.

With reference to FIG. 13, the cover 61 is constructed such that the width of the cover 61 substantially coincides with the width of the arm head 55. That is, the cover 61 is sized to closely cover the arm head 55.

Operation of the wiper arm 52 constructed in the above manner will be described with reference to FIGS. 14A to 15B.

In order to install and tighten the nut 14 (FIG. 9) onto the distal end of the pivot shaft 13 in the connecting operation of the wiper arm 52 to the vehicle (pivot shaft 13), the cover 61 is first rotated to open the cover 61 relative to the arm head 55. When the cover 61 is rotated and is thus opened relative to the arm head 55, each protrusion 64a, which protrudes from the corresponding hinge projection 64, is rotated together with the cover 61. In order to fully open the cover 61, the protrusion 64a needs to be rotated beyond the line C toward the line A in FIG. 14B. When the protrusions 64a move beyond the corresponding locking projections 66, respectively, the lateral walls of the cover 61 are bent or expanded outwardly by the locking projections 66 in the widthwise direction of the cover 61. Since the size of the step between the hinge projection 64 and the protrusion 64a in the widthwise direction of the cover 61 is larger than the thickness of the locking projection 66, the hinge connection between the hinge projection 64 and the hinge hole 63 is not released even when the lateral walls of the cover 61 are bent outwardly in the widthwise direction of the cover 61.

Figure 14A:
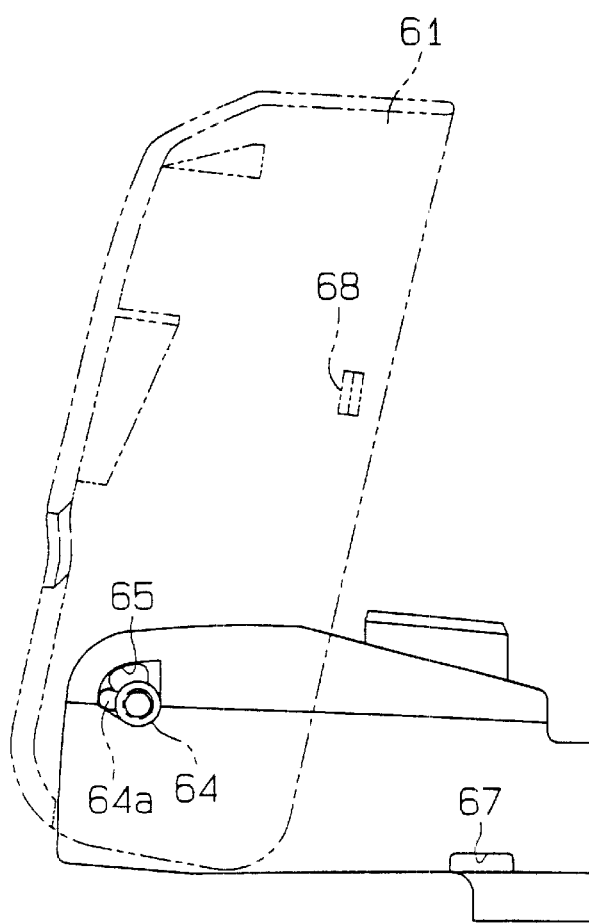
FIG. 14A is a descriptive view showing the arm head and the cover in a fully opened state of the cover.

As shown in FIG. 14A, due to the fact that the angle between the opening movement limiting end 65a and the closing movement limiting end 65b is set to about 90 degrees, when the cover 61 is fully opened, an angle between the fully opened cover 61 and the arm head 55 is also set to about 90 degrees.

Figure 14B:
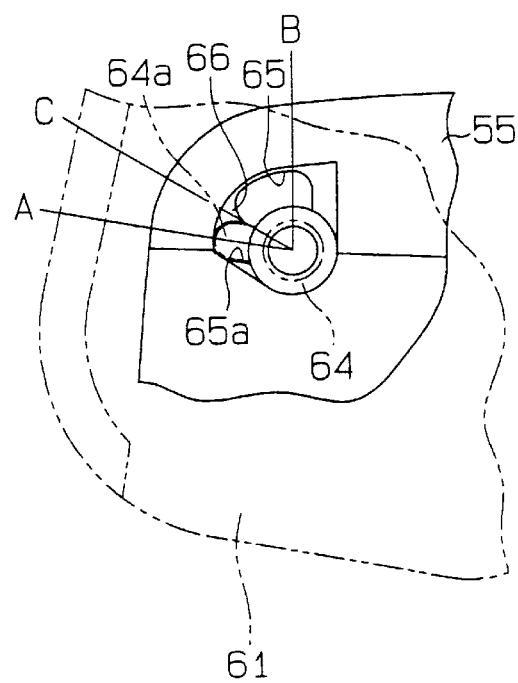
FIG. 14B is a partial enlarged view of FIG. 14A.

As shown in FIG. 14B, when the cover 61 is fully opened, the protrusion 64a is located between the opening movement limiting end 65a and the locking projection 66. The radial length of the protrusion 64a in the radial direction of the hinge projection 64 is substantially the same as the radial length of the rotation guide 65 in the radial direction of the hinge hole 63. Furthermore, the circumferential width of the protrusion 64a is substantially the same as the width between the locking projection 66 and the opening movement limiting end 65a. As a result, the rotation of the protrusion 64a in both directions is limited by the locking projection 66 and the opening movement limiting end 65a, and thus chattering of the cover 61 is effectively restrained. When the protrusion 64a is engaged with the locking projection 66, the cover 61 is held in the fully opened position, as shown in FIG. 14A. The opening movement limiting end 65a, the locking projections 66 and the protrusions 64a constitute a fully opened position holding means of the present invention.

As shown in FIG. 14B, the locking projection 66 is sized such that the protrusion 64a moves beyond the locking projection 66 when the force equal to or greater than the predetermined value is applied to the cover 61. Thus, after the wiper arm 52 is connected to the vehicle (pivot shaft 13), the cover is moved to the closed position.

Figure 15A:
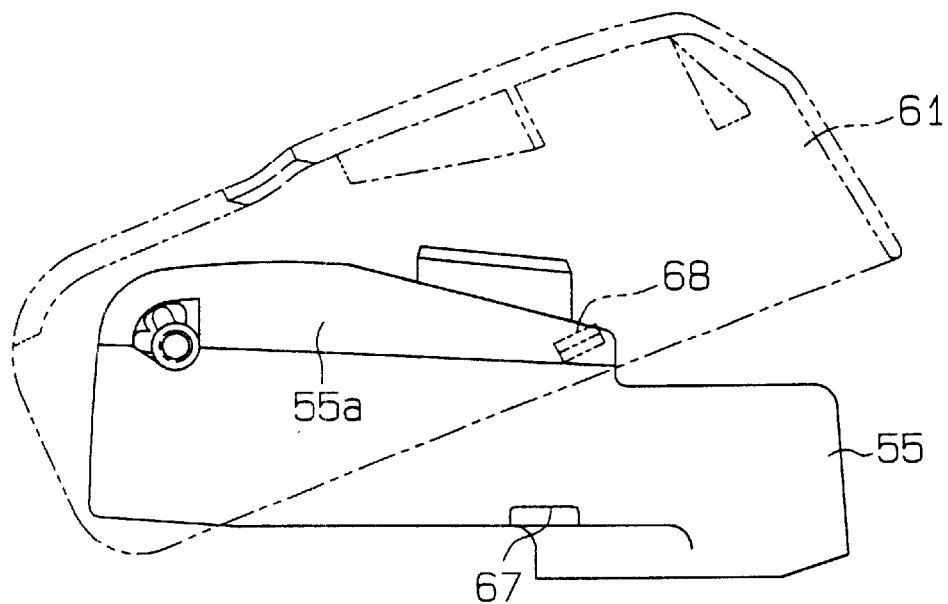
FIG. 15A is a schematic side view showing the arm head and the cover in an incompletely closed state of the cover.

As shown in FIG. 15A, the lateral inner wall surfaces of the cover 61 are formed such that a distance between the lateral inner wall surfaces of the cover 61 is substantially the same as the width of the arm head 55. Thus, before the cover 61 is fully closed, each engaging claw 68, which protrudes from the corresponding lateral inner wall surface of the cover 61, abuts against or is resiliently engaged with the corresponding tapered surface 55a of the arm head 55. As a result, the cover 61 is held in the incompletely closed state where the cover 61 does not fully close the arm head 55.

Figure 15B:
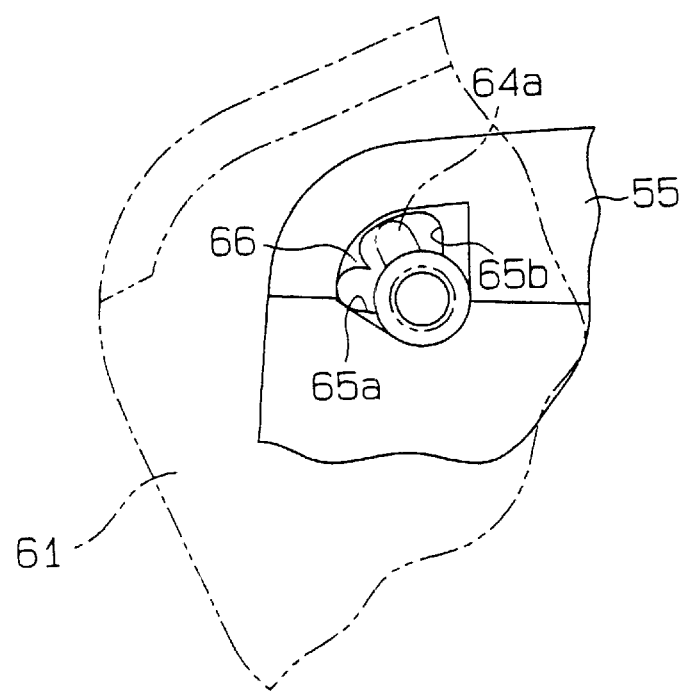
FIG. 15B is a partial enlarged view of FIG. 15A.

As shown in FIG. 15B, in the incompletely closed state of the cover 61, each protrusion 64a is located between the locking projection 66 and the closing movement limiting end 65b. At this state, the abutment of each engaging claw 68 against the top portion of the tapered surface 55a restrains the cover 61 from moving toward the fully closed position, so that each protrusion 64a cannot be rotated toward the closing movement limiting end 65b. Furthermore, each locking projection 66 is formed in the corresponding rotation guide 65, so that the protrusion 64a cannot be rotated toward the opening movement limiting end 65a at this state unless the force equal to or greater than the predetermined value is applied to the protrusion 64a toward the opening movement limiting end 65a. The rotation of each protrusion 64a in both the directions is thus limited within a predetermined range when the cover 61 is placed in the incompletely closed state. As a result, the rotation of the cover 61 in both the directions is also limited within the predetermined range when the cover 61 is placed in the incompletely closed state. The engaging claws 68, the protrusions 64a and the locking projections 66 constitute the intermediate position holding means of the present invention.

When the cover 61 is placed in the incompletely closed state shown in FIG. 15A, the engaging claws 68 abut against the tapered surfaces 55a to restrain the further rotation of the cover 61. Thus, the cover 61 is not fully closed. At this state, when the cover 61 needs to be fully closed to cover the arm head 55 with the cover 61, the force needs to be applied to the cover 61 in the closing direction. When the force is applied to the cover 61 in the closing direction to cover the arm head 55 with the cover 61, the engaging claws 68 are gradually urged laterally outwardly by the corresponding tapered surfaces 55a located on the lateral sides of the arm head 55.

When the cover 61 is forced to rotate in the closing direction from the incompletely closed state relative to the arm head 55 and thus is fully closed, the engaging claws 68 are engaged with the engaging recesses 67. Thus, the fully closed state of the cover 61 relative to the arm head 55 is maintained.

The second embodiment provides the following advantages.

(1) The cover 61 is held in the opened position by the protrusions 64a and the locking projections 66. Thus, when the cover 61 is held in the open state, the cover 61 is restrained from being unintentionally closed by the relatively small vibrations or the relatively small loads. As a result, in the connecting operation of the wiper arm 52 to the pivot shaft 13, the cover 61 can be fixedly held in the open state and will not interfere with the connecting operation of the wiper arm 52 to the pivot shaft 13.

(2) Before the cover 61 is fully closed (i.e., in the incompletely closed state), the rotation of the cover 61 in both the directions is limited. Thus, the cover 20 is restrained from being fully closed to cause engagement between the engaging claws 68 and the engaging recesses 67 by the relatively small vibrations, for example, during the transportation of the wiper 50. As a result, in the connecting operation of the wiper arm 52 to the pivot shaft 13, it is not required to disengage the engaging claws 68 from the engaging recesses 67, and thus the cover 61 can be easily fully opened. This allows acceleration of the connecting operation of the wiper arm 52 to the pivot shaft 13.

(3) Rotation of the cover 61 in both the directions is limited within the predetermined range at the incompletely closed state of the cover 61. Thus, relatively large amount of rotation of the cover 61 during the transportation can be restrained, and thus damage or the like to the product can be restrained.

(4) The open state of the cover 61 is maintained by the protrusions 64a and the locking projections 66. Thus, when the cover 61 is held in the open state, the cover 61 does not contact the wiper arm 52. Because of this arrangement, external force is not applied to the cover 61, and thus deformation of the cover 61 by application of the external force can be advantageously restrained.

(5) The tapered surfaces 55a are provided on the lateral sides of the arm head 55, respectively, in such a manner that the width of the arm head 55 is progressively reduced toward the top of the arm head 55. Furthermore, the inner lower end of each engaging claw 68, which contacts the arm head 55, is tapered. Thus, the tapered surface of each engaging claw 68 and the corresponding tapered surface 55a of the arm head 55 contact each other. As a result, the cover 61 having the engaging claws 68 can be gradually laterally outwardly expanded through the contact between the tapered surface of each engaging claw 68 and the corresponding tapered surface 55a of the arm head 55. Thus, the cover 61 can be easily and smoothly closed relative to the arm head 55.

(6) The size of the step between the inner end surface (located on the center side of the cover 61) of the hinge projection 64 and the inner end surface (located on the center side of the cover 61) of the protrusion 64a in the widthwise direction of the cover 61 is larger than the thickness of the locking projection 66. Thus, even when each protrusion 64a moves beyond the locking projection 66, each hinge projection 64 is still effectively engaged with the corresponding hinge hole 63. As a result, the hinge connection between the cover 61 and the arm head 55 is advantageously maintained when the cover 61 is rotated.

The above embodiments can be modified as follows.

In the first embodiment, each hinge hole 26 is formed in the base end portion 12a, and each hinge projection 34 is formed in the cover 20 (leg 33) to hingedly connect the cover 20 to the base end portion 12a. Alternatively, each hinge projection can be formed in the base end portion 12a, and each hinge hole can be formed in the cover 20 (leg 33) to hingedly connect the cover 20 to the base end portion 12a.

In the first embodiment, the cover 20 is fully opened when the proximal end of the covering portion 31 abuts against the top plate 22. However, this arrangement can be modified such that the cover 20 is fully opened when the legs 33 of the cover 20 abut against the steps 25a of the cover attaching portions 25, respectively.

In the first embodiment, the holding holes 27 are formed in the base end portion 12a, and the holding projections 35 are formed in the cover 20 to hold the cover 20 in the incompletely closed state. However, this arrangement can be modified such that the holding projections are formed in the base end portion 12a, and the holding holes are formed in the cover 20 to hold the cover 20 in the incompletely closed state.

Furthermore, the cover 20 can be held in the incompletely closed state by any other way without use of the holding holes and the holding projections. Even with such a modification, the advantages similar to those discussed above can be achieved.

In the second embodiment, the hinge holes 63 are formed in the arm head 55, and the hinge projections 64 are formed in the cover 61 to hingedly connect the cover 61 to the arm head 55. However this arrangement can be modified such that the hinge projections are formed in the arm head 55, and the hinge holes are formed in the cover 61 to hingedly connect the cover 61 to the arm head 55.

In the second embodiment, the tapered surfaces are provided in both the arm head 55 and the engaging claws 68 to achieve the engagement between the arm head 55 and the engaging claws 68 through the tapered surfaces. However, this arrangement can be modified such that curved surfaces are provided in both the arm head 55 and the engaging claws 68 to achieve the engagement between the arm head 55 and the engaging claws 68 through the curved surfaces, allowing smooth closing operation of the cover relative to the arm head.

Additional advantages and modifications will readily occur to those skilled in the art. The invention in its broader terms is therefore, not limited to the specific details, representative apparatus, and illustrative examples shown and described.

What is claimed is:

1. A wiper arm comprising:
   an arm head, which is securely connected to a pivot shaft;
   a cover, which is connected to the arm head for covering at least part of the arm head and is rotatable in a closing direction and an opening direction about a rotational axis thereof between a fully closed position and a fully opened position relative to the arm head; and
   an intermediate position holding means for restraining rotation of the cover in both the closing direction and the opening direction at at least one intermediate position between the fully opened position and the fully closed position.

2. A wiper arm according to claim 1, wherein the at least one intermediate position includes a slightly opened position, which is located adjacent to the fully closed position.

3. A wiper arm according to claim 1, wherein the intermediate position holding means includes:
   at least one holding projection, which is provided in one of the cover and the arm head; and
   at least one holding hole, which is provided in the other of the cover and the arm head and is engageable with a corresponding one of the at least one holding projection.

4. A wiper arm according to claim 3, wherein:
   the cover is hingedly connected to the arm head through a couple of hinge holes, which are provided in one of the cover and the arm head, and also through a couple of hinge projections, which are provided in the other of the cover and the arm head and are engaged with the hinge holes, respectively; and
   a projecting length of each holding projection is shorter than a projecting length of each hinge projection.

5. A wiper arm according to claim 4, wherein the hinge holes are provided in the arm head, and the hinge projections are provided in the cover.

6. A wiper arm according to claim 4, wherein:
   the arm head includes a securing portion, wherein the securing portion has a pivot shaft receiving hole for receiving a distal end of the pivot shaft therethrough and is securely connected to the distal end of the pivot shaft;
   the at least part of the arm head covered by the cover is the securing portion of the arm head;
   the cover includes a covering portion and a couple of legs, wherein the covering portion of the cover covers the securing portion of the arm head, and the legs extend from the covering portion of the cover;
   the hinge projections are provided in inner lateral wall surfaces of the legs, respectively, of the cover, wherein each hinge projection has a tapered surface, which extends from a distal end of each hinge projection; and
   the hinge holes are provided in outer lateral wall surfaces, respectively, of the arm head.

7. A wiper arm according to claim 3, wherein:
   the at least one holding projection is provided in an inner wall surface of the cover; and
   the at least one holding hole is provided in an outer wall surface of the arm head.

8. A wiper arm according to claim 7, wherein when the cover is rotated in the closing direction, each holding projection is resiliently engaged with an outer wall surface of the arm head to restrain the rotation of the cover before each holding projection is engaged with the corresponding one of the at least one holding hole.

9. A wiper arm according to claim 3, wherein a distal end of each holding projection is rounded.

10. A wiper arm according to claim 1, wherein:
- a distal end of the cover positioned in the fully closed position is located below the distal end of the cover positioned in the fully opened position and is placed on a first side of a plane, which extends through the rotational axis of the cover in a direction parallel to a gravity direction; and
- the distal end of the cover positioned in the fully opened position is placed on a second side of the plane, which is opposite to the first side of the plane.

11. A wiper arm according to claim 1, wherein:
the cover is hingedly connected to the arm head through a couple of hinge holes, which are provided in one of the cover and the arm head, and also through a couple of hinge projections, which are provided in the other of the cover and the arm head and are engaged with the hinge holes, respectively; and
the intermediate position holding means includes:
- (a) at least one holding projection, which protrudes from the cover and is resiliently engaged with an outer wall surface of the arm head to restrain the rotation of the cover when the cover is rotated in the closing direction;
- (b) at least one first engaging protrusion, which is provided in the other of the cover and the arm head and protrudes from a corresponding one of the hinge projections; and
- (c) at least one second engaging protrusion, which is provided in the one of the cover and the arm head and is located adjacent to a corresponding one of the hinge holes;

the at least one second engaging protrusion abuts against a corresponding one of the at least one first engaging protrusion to restrain the rotation of the cover when the cover is rotated in the opening direction; and each first engaging protrusion is movable beyond a corresponding one of the at least one second engaging protrusion in the opening direction and the closing direction when a force equal to or greater than a predetermined value is applied to each first engaging protrusion in the opening direction and the closing direction, respectively.

12. A wiper arm according to claim 11, wherein:
the at least one first engaging protrusion protrudes in a radial direction of the corresponding one of the hinge projections; and
the at least one second engaging protrusion protrudes in a radial direction of the corresponding one of the hinge holes.

13. A wiper arm according to claim 11, further comprising a fully opened position holding means for restraining the rotation of the cover in the closing direction at the fully opened position.

14. A wiper arm according to claim 13, wherein the fully opened position holding means includes:
the at least one first engaging protrusion;
the at least one second engaging protrusion; and
at least one opening movement limiting end, which is provided in the one of the cover and the arm head and is located adjacent to a corresponding one of the hinge holes, wherein when the cover is positioned in the fully opened position, each first engaging protrusion abuts against a corresponding one of the at least one opening movement limiting end and is held between the corresponding one of the at least one second engaging protrusion and the corresponding one of the at least one opening movement limiting end.

15. A wiper arm according to claim 1, wherein the cover is made of a resin material and has resiliency.

* * * * *